(12) United States Patent
Miller et al.

(10) Patent No.: US 7,341,300 B2
(45) Date of Patent: Mar. 11, 2008

(54) UPPER GLOVE BOX LATCH HOUSING KNEE IMPACT PROTECTOR

(75) Inventors: Gregory S. Miller, Waterford, MI (US); Paul W. Nagy, Macomb, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 6 days.

(21) Appl. No.: 11/422,079

(22) Filed: Jun. 4, 2006

(65) Prior Publication Data

US 2007/0278812 A1    Dec. 6, 2007

(51) Int. Cl.
*B60N 3/12* (2006.01)

(52) U.S. Cl. ............................. 296/37.12; 292/DIG. 37

(58) Field of Classification Search .............. 296/37.12, 296/37.1, 37.7, 37.8; 292/DIG. 37, DIG. 23, 292/336.3, DIG. 31; 340/825.69; 126/197; 280/752; 70/208
See application file for complete search history.

(56) References Cited

U.S. PATENT DOCUMENTS

| | | | | | |
|---|---|---|---|---|---|
| 2,301,282 | A | * | 11/1942 | Jacobi | ......................... 292/227 |
| 2,313,711 | A | * | 3/1943 | Jacobi | ................. 292/DIG. 37 |
| 2,337,894 | A | * | 12/1943 | Jacobi | ................. 292/DIG. 37 |
| 2,639,932 | A | * | 5/1953 | Young | ...................... 292/336.3 |
| 3,036,453 | A | * | 5/1962 | Dubonnet | ............ 292/DIG. 37 |
| 4,223,940 | A | | 9/1980 | Janz et al. | |
| 5,098,141 | A | | 3/1992 | Bull | |
| 5,292,159 | A | | 3/1994 | Sandhu et al. | |
| 5,476,283 | A | | 12/1995 | Elton | |
| 5,484,178 | A | * | 1/1996 | Sandhu et al. | ....... 292/DIG. 31 |
| 5,782,510 | A | | 7/1998 | Gass | |
| 5,823,612 | A | * | 10/1998 | Angelo | ..................... 296/37.12 |
| 6,113,160 | A | * | 9/2000 | Johansson et al. | ... 292/DIG. 37 |
| 6,120,069 | A | | 9/2000 | Taranto | |
| 6,629,716 | B2 | * | 10/2003 | Shibata et al. | ............. 296/37.7 |
| 6,722,718 | B2 | | 4/2004 | Brown et al. | |
| 2005/0116449 | A1 | * | 6/2005 | Enders | .................... 280/730.1 |
| 2007/0186598 | A1 | * | 8/2007 | Najima | ....................... 70/208 |

* cited by examiner

*Primary Examiner*—Kiran B. Patel
(74) *Attorney, Agent, or Firm*—Earl LaFontaine

(57) ABSTRACT

A glove box is provided comprising an instrument panel substrate and a door panel rotatably mounted thereto. A push button assembly includes a latch element movable between a door panel engagement position and a door panel release position. The assembly farther includes a push button element including a button activation surface having a button height and a button width. The push button is in communication with the latch element to move it into the door panel release position. A rigid button housing is included having a rigid perimeter surrounding the button activation surface. The button height is insufficient to allow knee intrusion activation.

7 Claims, 2 Drawing Sheets

UPPER GLOVE BOX LATCH HOUSING KNEE IMPACT PROTECTOR

TECHNICAL FIELD

The present invention relates generally to a glove box assembly and more particularly to a glove box assembly configured to be highly resistant to knee intrusion activation.

BACKGROUND OF THE INVENTION

Automotive designs are commonly guided under principles of customer convenience and satisfaction. As such simple operational controls are often valued over complex counterintuitive controls. Single-push controls often act as the pinnacle of simplicity. Unfortunately, convenience is not the sole controlling factor of automotive design. In addition, reliability and consumer protection concerns must also be incorporated into any design. Therefore, although single-push controls may be convenient, they carry with them concerns regarding accidental or unintentional activation.

Such is the case with modern automotive glove compartment assemblies. The style and placement of handles and latches necessary for opening and retaining the glove compartment doors must be configured to provide simple and reliable activation. In addition, it is desirable for such latch systems to utilize as little in-box space as possible to maximize storage. The latch system must also be visually appealing and not detract from the desired flow and appearance of the overall instrument panel. Finally, but significantly it is important that any such latch system be highly resistant to accidental or unintentional activation. Such activation would result in the glove compartment door opening in undesirable circumstances.

Passenger entry and exit from the vehicle often results in contact with the instrument panel and the glove compartment. Such contact can result in latch activation and unwarranted compartment opening. This can result in a severe loss of customer satisfaction due to frustration. More importantly, however, it is known that knee intrusion in to the glove compartment during an impact event could result in an accidental opening of the glove box. This is highly undesirable.

It would therefore be highly desirable to have a glove box assembly that would integrate a superior appearance with operational simplicity. It would be further desirable for such a glove box assembly to be highly resistant towards unintentional and accidental opening.

SUMMARY OF THE INVENTION

In accordance with the objects of the present invention a glove box is provided comprising an instrument panel substrate and a door panel rotatably mounted thereto. A push button assembly includes a latch element movable between a door panel engagement position and a door panel release position. The assembly further includes a push button element including a button activation surface having a button height and a button width. The push button is in communication with the latch element to move it into the door panel release position. A rigid button housing is included having a rigid perimeter surrounding the button activation surface. The button height is insufficient to allow knee intrusion activation.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
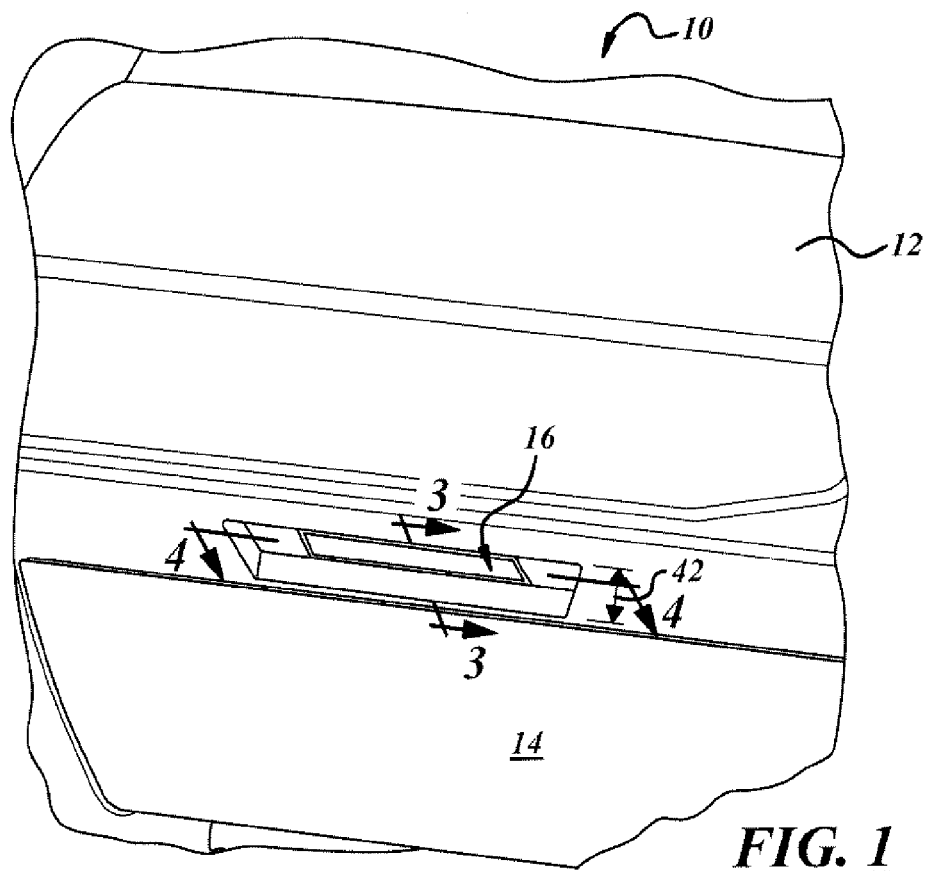
FIG. 1 is an illustration a glove box assembly in accordance with the present invention.

Referring now to FIG. 1, which is an illustration of an automotive glove box assembly 10 in accordance with the present invention. The glove box assembly 10, includes an instrument panel substrate 12 to which a door panel 14 is rotatably mounted. A concern with modern glove box assemblies 10 arises from the desire for simply operated and aesthetically pleasing controls while preventing accidental or undesirable activation such as knee impact activation which occurs when a passenger's knee activates a latch holding the door panel 14 closed.

Figure 2:
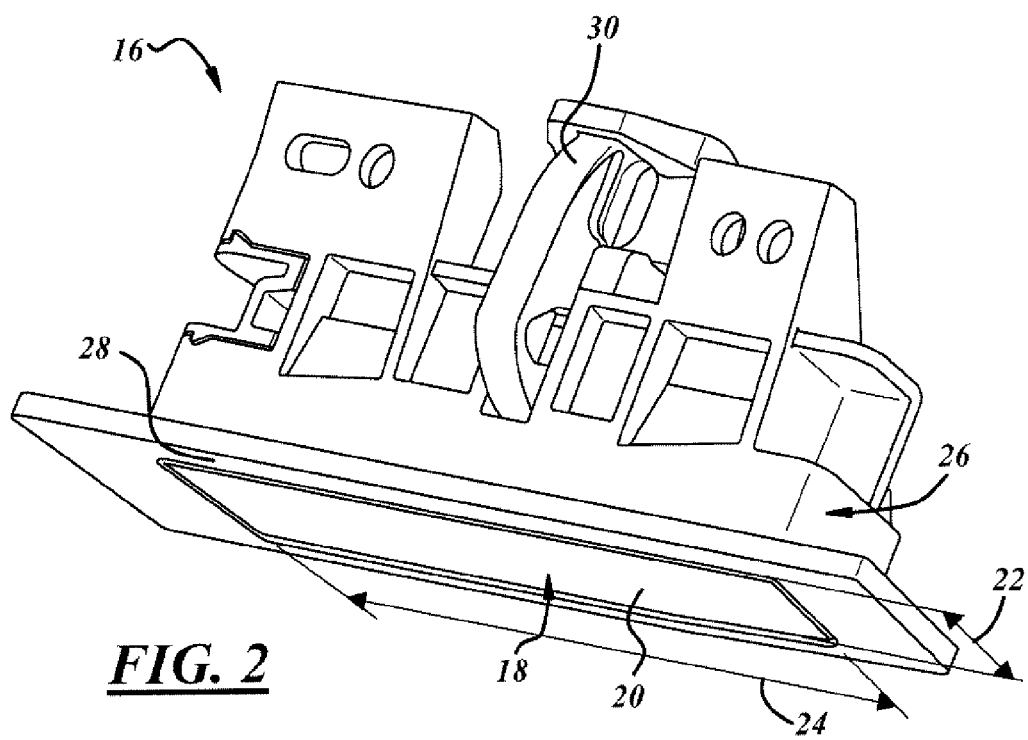
FIG. 2 is a detailed illustration of a push button assembly for use in the glove box assembly illustrated in FIG. 1.
Figure 3:
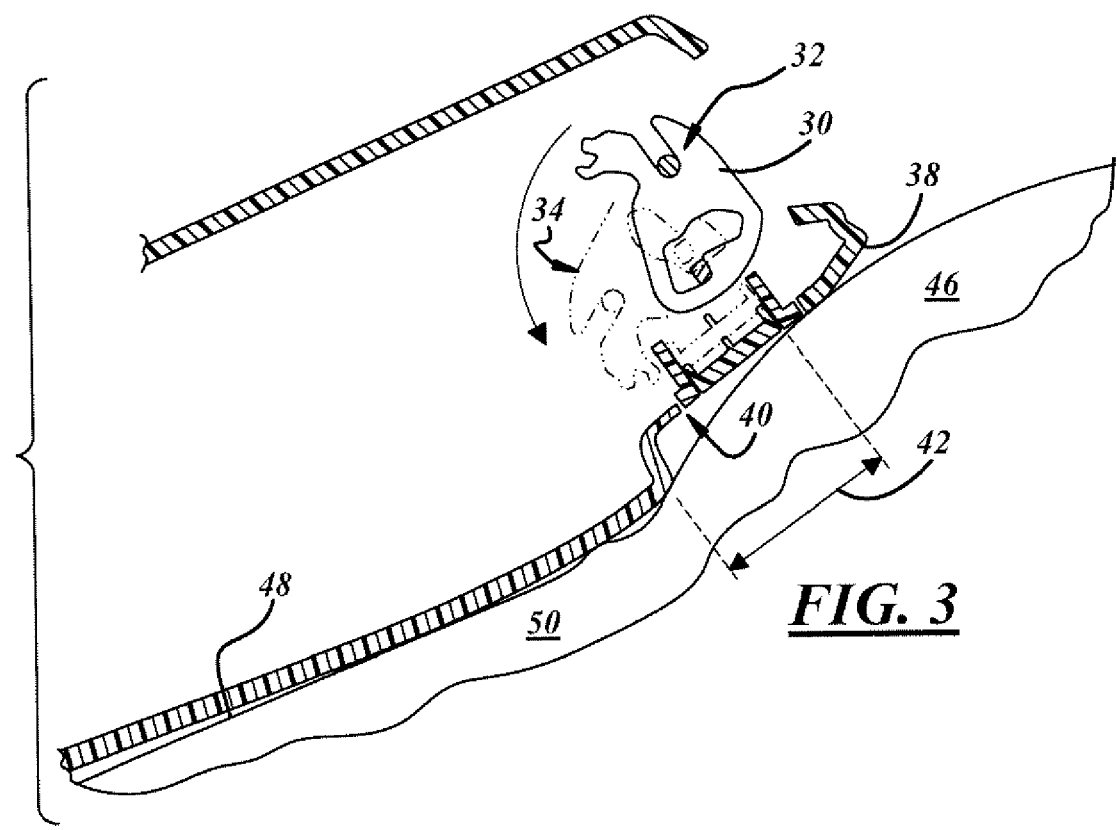
FIG. 3 is a cross-section illustration of the glove box assembly illustrated in FIG. 1, the cross-section illustrating defeated knee intrusion activation.
Figure 4:
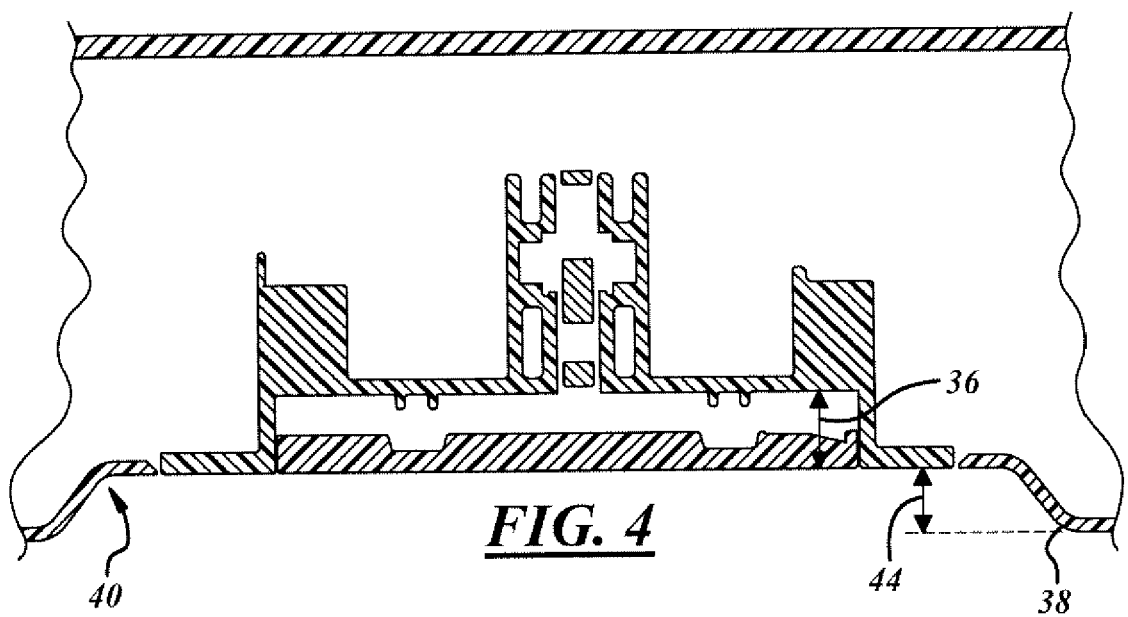
FIG. 4 is a detail cross-sectional illustration of the glove box assembly illustrated in FIG. 1.

The present invention addresses these concerns through the use of a push button assembly 16 as detailed in FIG. 2. The push button assembly includes a push button element 18 with a button activation surface 20 having a button height 22 and a button width 24. A rigid button housing 26 houses the push button element 18 and forms a rigid perimeter 28 around the button activation surface 20. The rigid perimeter 28 in combination with the button height 24 are configured to prevent knee intrusion activation such as illustrated in FIG. 3. The push button element 18 may be activated by pressing inward within the rigid button housing 26, which thereby facilitates a latch element 30 to move from a door engagement position 32 to a door release position 34. The latch element 30 is preferably biased toward the door engagement position 32. Although button height 22 and button activation depth 36 (see FIG. 4) may be designed to solely remove knee intrusion activation, the present invention contemplates further improvements to reduce this undesirable result.

In one embodiment, the present invention contemplates the push button assembly 16 mounted within an outer display surface 38 of the instrument panel substrate 12 positioned directly above the door panel 14. The push button assembly 16 is preferably mounted within a recessed mount surface 40 having a recessed surface height 42 and a recess surface depth 44. The recessed surface height 42 and recessed surface depth 44 are configured to prevent knee intrusion activation. This is accomplished by minimizing the recessed surface height 42 and depth 44 until an acceptable range of knees 46 fail to generate activation. Although the recessed surface depth 44 may be held constant, in one embodiment it is contemplated that the recessed surface depth 44 progressively increases along the recessed surface height 42. This increase in depth 44 helps prevent intrusion activation.

Finally, it is contemplated that the door panel 14 may be formed with a tibia engaging surface 48 configured that such during impact a passengers tibia 50 contacts such a surface and the knee 46 is thereby directed away from the push button assembly 16 and the recessed mount surface 40. This further helps in insuring that during impact, a passenger's knee will fail to activate the push button assembly 16.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A glove box assembly comprising:
   an instrument panel substrate including an outer display surface;
   a door panel rotatably mounted to said instrument panel substrate;
   a push button assembly comprising:
   a latch element movable between a door panel engagement position and a door panel release position, said latch element biased towards said door panel engagement position, said latch element restraining said door panel when in said door panel engagement position;
   a push button element including a button activation surface having a button height and a button width, said push button in communication with said latch element, said push button moving said latch element into said door panel release position;
   a rigid button housing including a rigid perimeter surrounding said button activation surface, said push button assembly mounted within a recessed mount surface, said recessed mount surface having a recessed surface height and a recessed surface depth, said recessed mount surface configured to prevent knee intrusion activation.

2. A glove box assembly as described in claim 1, wherein said push button assembly is mounted within said instrument panel substrate above said door panel.

3. A glove box assembly as described in claim 1, wherein said recessed surface depth progressively increases along said recessed surface height.

4. A glove box assembly as described in claim 1, wherein said door panel includes a tibia engaging surface configured to prevent knee intrusion activation.

5. A glove box assembly as described in claim 1, wherein said recessed surface height is insufficient to allow knee intrusion activation.

6. A glove box assembly as described in claim 1, wherein said recessed surface depth is configured to prevent knee intrusion activation.

7. A glove box assembly as described in claim 1, wherein said button height insufficient to allow knee intrusion activation.

* * * * *